(12) United States Patent
Kikuchi

(10) Patent No.: US 6,384,548 B1
(45) Date of Patent: May 7, 2002

(54) HORIZONTAL DEFLECTION CIRCUIT

(75) Inventor: Ken Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/395,009

(22) Filed: Sep. 13, 1999

(30) Foreign Application Priority Data

Sep. 14, 1998 (JP) .......................................... 10-260468

(51) Int. Cl.⁷ ............................................... G09G 1/04
(52) U.S. Cl. ...................................... 315/398; 315/407
(58) Field of Search ............................. 315/398, 411, 315/399, 407, 408, 387, 395, 370, 371; G09G 1/04

(56) References Cited

U.S. PATENT DOCUMENTS

| | | | | |
|---|---|---|---|---|
| 3,917,977 A | * | 11/1975 | Izumisawa .................. | 315/395 |
| 3,944,882 A | | 3/1976 | Takahashi .................... | 315/398 |
| 4,163,179 A | * | 7/1979 | Farina et al. ................ | 315/408 |
| 4,206,388 A | * | 6/1980 | Ishigaki et al. ............. | 315/371 |
| 4,242,714 A | * | 12/1980 | Yoshida et al. ............. | 315/408 |
| 4,464,612 A | * | 8/1984 | Teuling ........................ | 315/408 |
| 4,540,933 A | * | 9/1985 | Tueling ........................ | 315/271 |
| 5,596,249 A | * | 1/1997 | Ochiai ......................... | 315/371 |

FOREIGN PATENT DOCUMENTS

| | | | |
|---|---|---|---|
| GB | 2 222 058 | 2/1990 | ......... H04N/3/227 |
| WO | 94/07332 | 3/1994 | |

OTHER PUBLICATIONS

Patent Abstracts of Japan vol. 012, No. 106, Apr. 6, 1988, JP 62 234469.
Patent Abstracts of Japan vol. 009, No. 019, Jan. 25, 1985, JP 59 165570.

* cited by examiner

*Primary Examiner*—Don Wong
*Assistant Examiner*—Trinh Vo Dinh
(74) *Attorney, Agent, or Firm*—Frommer Lawrence & Haug LLP; William S. Frommer

(57) ABSTRACT

A horizontal deflection circuit comprising a centering circuit designed to change a direction of supplying a current to a deflection yoke, thereby to move a raster in a horizontal direction and, hence, adjust the position of the raster. The centering circuit comprises: a diode, of which cathode which is connected to the node of an S-shaped capacitor and the deflection yoke; a capacitor connected to the anode of the diode; a switching element connected in parallel to the diode; and a switching element control section for opening and closing the switching element, thereby to control a current to be supplied from the S-shaped capacitor to the capacitor and to control, ultimately, a current to be supplied to the deflection yoke. The raster position can be therefore continuously adjusted.

8 Claims, 9 Drawing Sheets

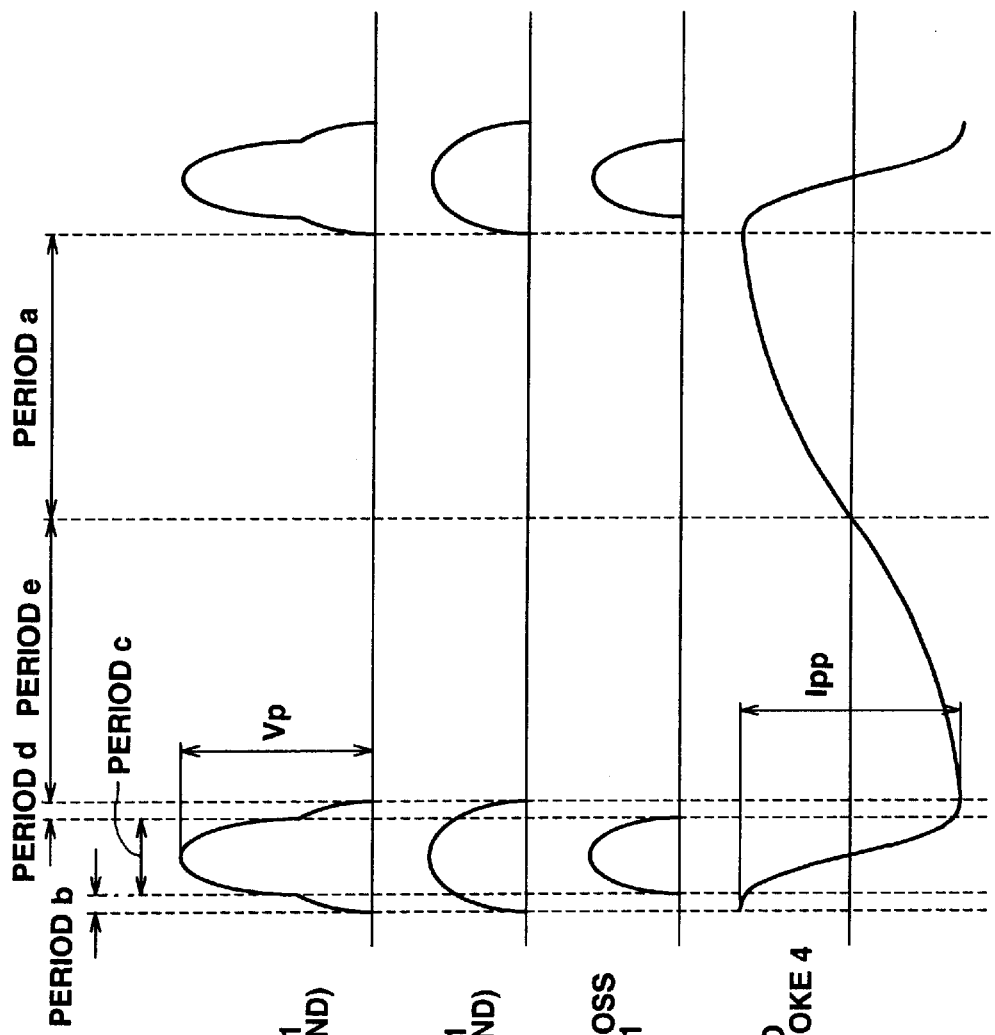

HORIZONTAL DEFLECTION CIRCUIT

BACKGROUND OF THE INVENTION

1. Field of the Invention

The present invention relates to a horizontal deflection circuit for use in a television display apparatus that incorporates a CRT (Cathode-ray Tube).

2. Description of the Related Art

Generally, in a video display incorporating a CRT, the raster position, which the electron beams emitted from the electron guns can reach, is displaced with respect to the screen. This is because the CRT has productive variation in raster position. As a consequence, the image displayed by the video display distorts in both vertical direction and horizontal direction, or parts of the raster fail to appear in the screen.

Most video displays, each incorporating a CRT, comprises a centering circuit that corrects the raster position. To move the raster position, a direct current is supplied to the deflection yokes. Usually the raster position can be easily corrected in the vertical direction, in view of the structure of the vertical deflection circuit. In the horizontal deflection circuit, which is usually a resonator circuit, however, it is often difficult to supply a direct current to the deflection yoke. In the television receivers, for example, the centering circuits 100 and 110 shown in FIGS. 1 and 2 have been used hitherto. More precisely, the centering circuits shown in FIGS. 1 and 2 are used in the horizontal deflection circuit of the so-called "diode modulator type," which is illustrated in FIG. 3.

The centering circuit 110 shown in FIG. 2 can be used in ordinary horizontal deflection circuits. However, it is large in circuitry size, and its manufacturing cost is inevitably high.

The centering circuit 100 shown in FIG. 1 can be manufactured at lower cost than any other types. However, it is not easy to incorporate the centering circuit 100 into a horizontal deflection circuit, for the following reason. As shown in FIG. 1, the centering circuit 100 comprises a choke coil 102, a capacitor 103, an S-shaped capacitor 104, a switch 106, and two diodes 107 and 108. The choke coil 102 connects the capacitor 103 to a power supply 101. The diodes 107 and 108 are selectively connected by the switch 106 to the node of the S-shaped capacitor 104 and a horizontal deflection yoke 105.

The switch 106 may be operated, selecting the diode 108 connected to the S-shaped capacitor 104. In this case, the diode 108 is turned on when the voltage across the S-shaped capacitor 104 falls below the voltage across the capacitor 103. Then, the voltage across the capacitor 103 falls along the voltage across the S-shaped capacitor 104. Hence, while the diode 108 remains on, a direct current can be supplied to the S-shaped capacitor 104 without imposing large influence on the resonance that the horizontal deflection circuit is achieving. The centering circuit 100 supplies a current equivalent to the current supplied to the S-shaped capacitor 104, from the power supply 101 to the horizontal deflection yoke 105, thereby moving the raster in the horizontal direction.

The switch 106 may selects the diode 107 that conducts a current in the direction opposite to the direction the diode 108 conducts a current. In this case, the diode 107 is turned on when the voltage across the S-shaped capacitor 104 rises above the potential of the capacitor 103. Then, a current is supplied to the capacitor 103 from the S-shaped capacitor 104, without affecting the resonance that the horizontal deflection circuit is achieving. As a result, the centering circuit 100 moves the raster in the opposite direction.

In the centering circuit 100 it is required that the average voltage of the power supply 101 be equal to the average voltage across the S-shaped capacitor 104. It would otherwise be impossible to achieve stable horizontal movement of the raster, either to the left or to the right.

In the horizontal deflection circuit described above, the voltage across the S-shaped capacitor 104 does not much depend on the voltage of the power supply 101 in most cases. The voltage across the S-shaped capacitor 104 is often higher than the voltage of the power supply 101. When a current flows throughout the centering circuit 100 if the diode 107 is selected to supply a current from the S-shaped capacitor 104 to the capacitor 103, a large current is therefore supplied to the horizontal deflection yoke 105. That is, the average voltage of the power supply 101 and the average voltage across the S-shaped capacitor 104 cannot be equal at all in the centering circuit 100. If a large current is supplied to the horizontal deflection yoke 105, the raster will be moved more than is necessary in the horizontal direction. In some cases, the raster position cannot be adjusted to an appropriate position.

To solve this problem, the voltage of the power supply 101 connected by the choke coil 102 to the capacitor 103 may be applied from another power supply of a higher voltage, not from the power supply that drives the deflection yoke of the horizontal deflection circuit. The use of another high voltage power supply will, however, render the centering circuit 100 too expensive to be used in ordinary television receivers.

SUMMARY OF THE INVENTION

The present invention has been made in view of the foregoing. The object of the invention is to provide an inexpensive horizontal deflection circuit that can effect a stable horizontal movement of raster.

To attain the object, a horizontal deflection circuit according to the invention has a centering circuit designed to change a direction of supplying a current to a deflection yoke, thereby to move a raster in a horizontal direction and, hence, adjust the position of the raster. The centering circuit comprises: a diode, of which cathode is connected to a node of an S-shaped capacitor and the deflection yoke; a capacitor connected at one end to the anode of the diode and at the other end to the ground; a switching element connected in parallel to the diode; and switching element control means for opening and closing the switching element, thereby to control a current flowing from the S-shaped capacitor to the capacitor and to control, ultimately, a current to be supplied to the deflection yoke.

The horizontal deflection circuit can therefore continuously adjust the raster position in the horizontal direction.

BRIEF DESCRIPTION OF THE SEVERAL VIEWS OF THE DRAWINGS

FIG. 5 is a timing chart illustrating the waveforms of the voltages and currents applied and supplied to various components of the horizontal deflection circuit.

DETAILED DESCRIPTION OF THE INVENTION

Embodiments of this invention will be described, with reference to the accompanying drawings.

Figure 1:
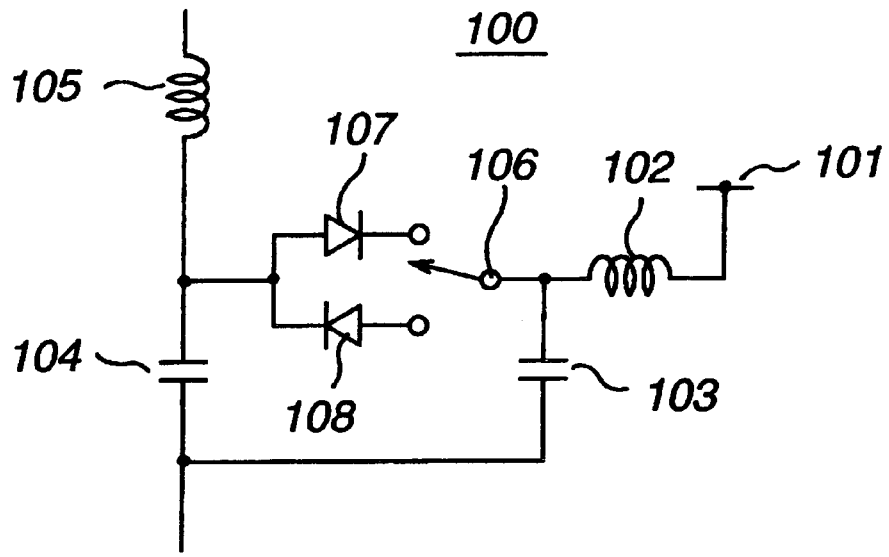
FIG. 1 is a diagram showing a conventional centering circuit.
Figure 2:
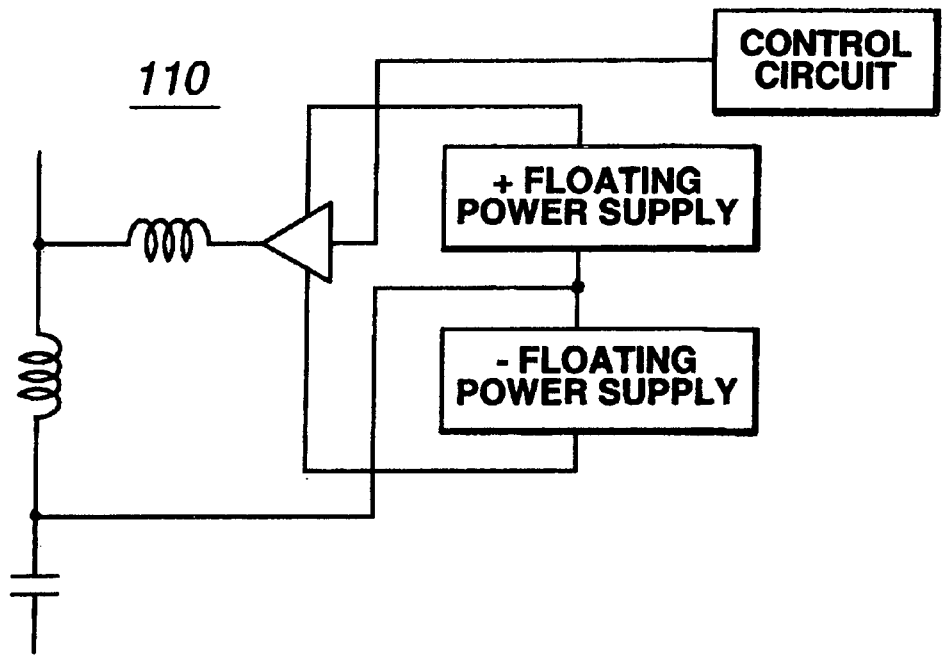
FIG. 2 is a diagram showing another conventional centering circuit.
Figure 3:
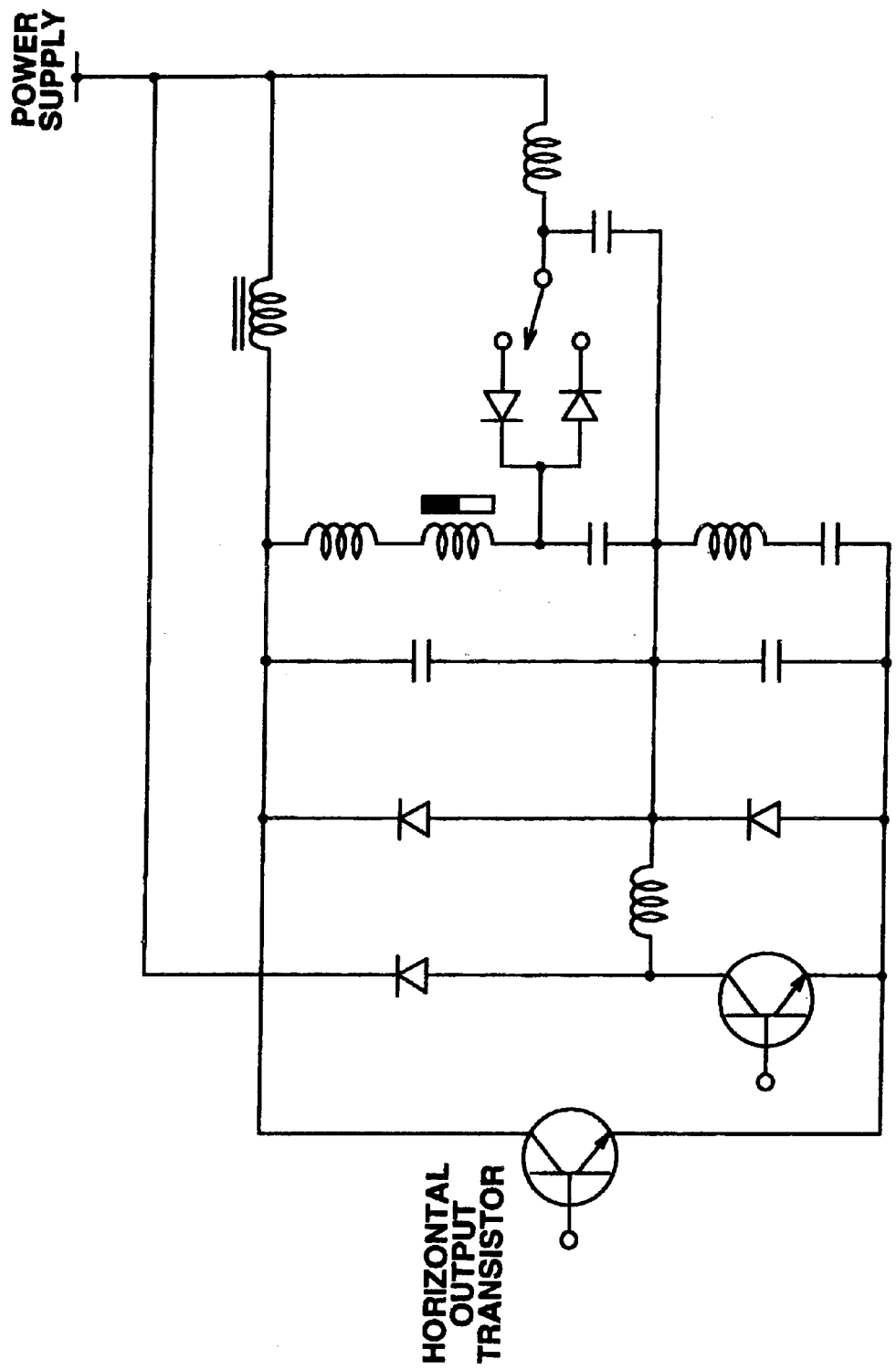
FIG. 3 is a diagram showing a horizontal deflection circuit of diode modulator type.
Figure 4:
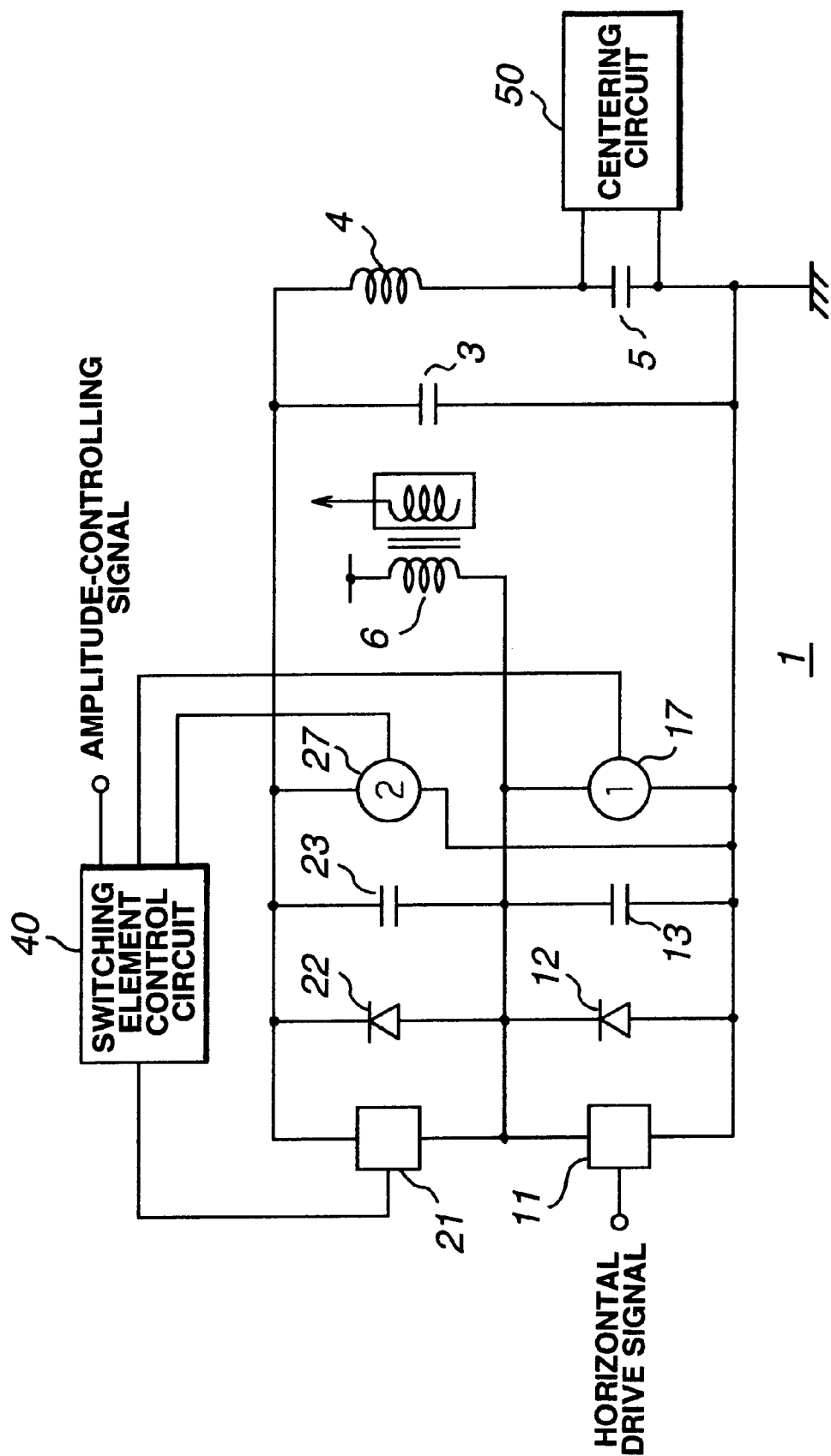
FIG. 4 is a diagram showing a horizontal deflection circuit according to the present invention.

A horizontal deflection circuit 1 according to the present invention has a structure shown in, for example, FIG. 4. The horizontal deflection circuit 1 is composed of two parallel circuits connected in series. The first parallel circuit comprises a horizontal-output switching element 11, a damper diode 12, and a resonant capacitor 13. The second parallel circuit is composed of a switching element 21, a damper diode 22, and a resonant capacitor 23. Power is supplied to the node of the parallel circuits through the primary winding of a flyback transformer 6. The end of the switching element 11, other than the end connected to the transformer 6, is connected to the ground. The end of the switching element 21, other than the end connected to the transformer 6, is connected to a horizontal deflection yoke 4. An S-shaped capacitor 5 has one end connected in series to the horizontal deflection yoke 4. The other end of the capacitor 5 is connected to the ground. A resonant capacitor 3 is connected in parallel to the series circuit composed of the horizontal deflection yoke 4 and the S-shaped capacitor 5. The horizontal deflection circuit 1 further comprises pulse-reading circuits 17 and 27, and a switching-element control circuit 40. The pulse-reading circuit 17 detects the voltage across the switching element 11. The pulse-reading circuit 27 detects the voltage across the switching element 21. The switching-element control circuit 40 turns on or off the switching element 21 on the basis of the voltages detected by the pulse-reading circuits 17 and 27.

Still further, the horizontal deflection circuit 1 comprises a centering circuit 50. The centering circuit 50 is connected both ends of the S-shaped capacitor 5 and supplies a direct current to the horizontal deflection yoke 4 in order to move the raster.

How the horizontal deflection circuit 1 operates will be explained below.

In the horizontal deflection circuit 1 shown in FIG. 4, a horizontal drive signal is input to the horizontal-output switching element 11. The element 11 is turned on. At the same time, the switching-element control circuit 40 is operated, turning on the switching element 21, too. Now that both switching elements 11 and 21 are on, a deflection current is supplied to the horizontal deflection yoke 4. The switching element 11 has been turned off prior to the switching element 21, initiating a retrace period (i.e., horizontal retrace period). During the retrace period the switching-element control circuit 40 turns the switching element 21 on or off The sequence of operations performed in horizontal retrace periods will be explained, with reference to the timing chart of FIGS. 5A to 5D and the equivalent circuit diagrams of FIGS. 6A, 6B and 6C. It should be noted that FIGS. 5A to 5D illustrates the waveforms of the voltages and currents applied and supplied to the components of the horizontal deflection circuit 1.

<Trace Period a>

Figure 6A:
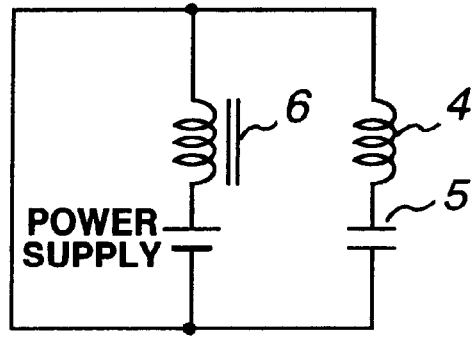
FIGS. 6A, 6B and 6C are basic equivalent circuit diagrams, explaining the operation of the horizontal deflection circuit.

During the trace period a, the both switching elements 11 and 21 remain on, Hence, the equivalent circuit assumes the structure of in FIG. 6A. This structure is identical to the structure of a horizontal deflection circuit that has one switching element. During the trace period a, the deflection current increases at the rate determined by the voltage across the S-shaped capacitor 5, and the current flowing in the flyback transformer 6 increases at the rate determined by the power supply voltage. FIG. 5D shows the waveform that the deflection current has during the trace period a.

<First Half of the Retrace Period>

The retrace period is initiated when the horizontal drive signal turns off the switching element 11. At this time the switching element 21 still remains on. The equivalent circuit therefore assumes the structure of in FIG. 6B. The current supplied to the flyback transformer 6 is supplied to the resonant capacitor 3 and 13, and the current supplied to the horizontal deflection yoke 4 is supplied to the resonant capacitor 3 and 13. As a result, a voltage is generated across the resonant capacitor 3, and a voltage is generated across the resonant capacitor 13. The deflection current therefore undergoes inversion, achieving resonance. FIG. 5B shows the voltage-current waveform that the deflection current has during the initial phase of the retrace period b.

<Off Period of Element 21 During the Retrace Period>

Figure 6B:
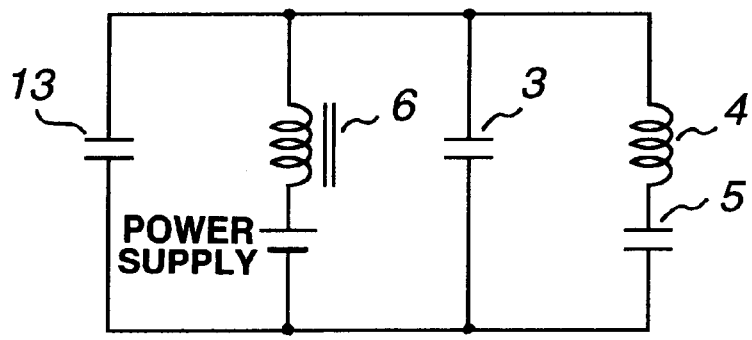
Figure 6C:
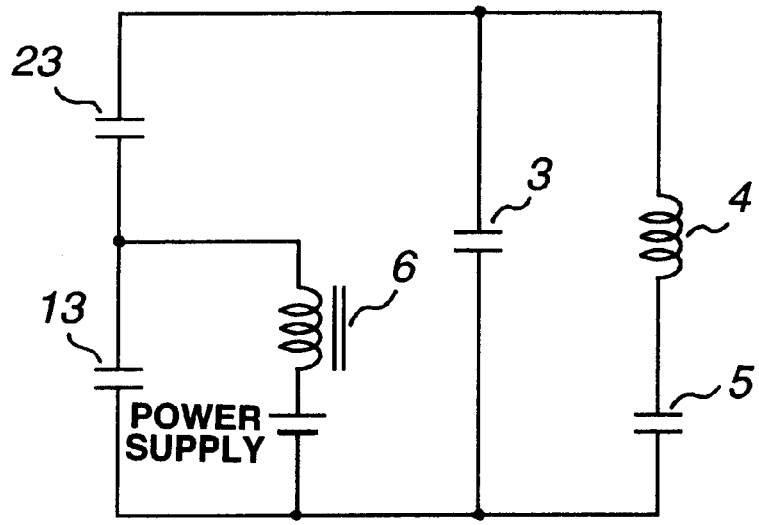

Even if the switching element 21 is turned off after the deflection current reaches the zero value during the latter half of the retrace period, the equivalent circuit still has the structure shown in FIG. 6B because of the damper diode 22. If the switching element 21 is turned off before the deflection current reaches the zero value during the first half of the retrace period, the equivalent circuit will take the structure shown in FIG. 6C. In this case, the resonant capacitor 23 is connected in series to the horizontal deflection yoke 4, in series to the resonant capacitor 13. The deflection current flows to the resonant capacitor 23, as well as the resonant capacitor 13. A voltage is generated across the resonant capacitor 23, too. A pulse voltage higher than the one applied across the switching element 11 can, therefore, be applied across the horizontal deflection yoke 4 (see FIG. 5A). The peak of the retrace voltage across the switching element 11 is determined by the ratio of the retrace period to the trace period and is, hence, constant. The flyback transformer 6 may boost the pulse voltage (FIG. 5B), and the pulse voltage boosted may be used as a high voltage in the electron gun of a CRT.

<Second Half of the Retrace Period>

The retrace period terminates when all charges flow out of the resonant capacitors 3, 13 and 23 and the voltages across them decrease to 0V, whereby the damper diode 12 and 22 is automatically turned on. (For the sake of simplicity, the diode is regarded as an ideal one.)

The current flowing into the resonant capacitor 23 is always smaller than the current flowing into the resonant capacitor 13. Hence, the resonant capacitor 23 is discharged faster than the resonant capacitor 13, and the damper diode 22 is turned on prior to the damper diode 12. The pulse generated across the switching element 21 therefore has a smaller width than the pulse generated across the switching element 11 (see the period c shown in FIGS. 5B and 5C).

The timing of turning off the switching element 21 may be further delayed. If so, the current flowing into the resonant capacitor 23 will decrease, and the pulse generated across the switching element 21 will have a smaller width and a lower height. Thus, the retrace pulse voltage applied across the horizontal deflection yoke 4 can be adjusted by controlling the timing of turning off the switching element 21. As a result of this, the deflection current can be changed in terms of amplitude.

<Trace Period e>

When the damper diode 22 is turned on, the equivalent circuit resumes the structure shown in FIG. 6B. The horizontal deflection circuit 1 keeps on performing retracing, in the same way as the ordinary deflection circuit, until the voltages across the resonant capacitors 3 and 13 fall to 0V. Upon completing the retracing, the equivalent circuit resumes the structure shown in FIG. 6A, whereby the trace period e is started. During the trace period e, the horizontal deflection current flows from the horizontal deflection yoke 4 through the damper diodes 12 and 22 in the forward direction thereof (see FIG. 5D). Therefore, the switching elements 11 and 21 remain on during the trace period e, so that they may be efficiently operated in the next trace period a.

As the horizontal deflection current repeatedly changes in the deflection periods a, b, c, d and e as has been described above, the horizontal deflection yoke 4 generates a horizontal deflection magnetic field from the horizontal deflection current.

Since the horizontal deflection magnetic field is thus generated, the horizontal deflection circuit 1 deflects the electron beams emitted from the electron gun.

Figure 7:
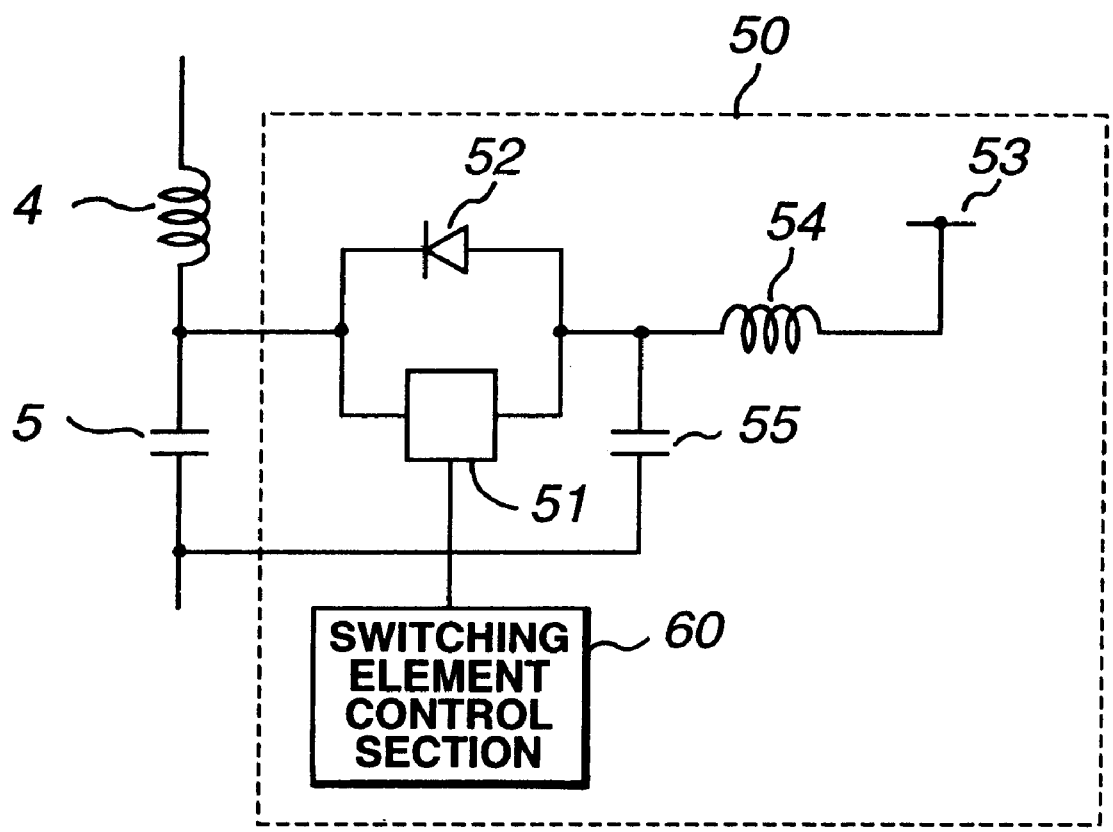
FIG. 7 is a diagram showing the centering circuit provided in the horizontal deflection circuit.

As shown in FIG. 7, the centering circuit 50 comprises a switching element 51, a diode 52, a DC power supply 53, a choke coil 54, and a capacitor 55. The switching element 51 and the diode 52 are connected in parallel, to the node of the horizontal deflection yoke 4 and the S-shaped capacitor 5. The DC power supply 53 applies a DC voltage to the choke coil 54. The capacitor 55 is connected to the anode of the diode 52. The centering circuit 50 further comprises a switching element control section 60. The section 60 is connected to the switching element 51, for turning on and off the switching element 51.

In the centering circuit 50, the capacitor 55 accumulates charge as the DC voltage is applied from the DC power supply 53. As a result, the S-shaped capacitor 5 is charged. A current flows into the diodes 52 and the switching element 51, in accordance with the potential difference between the S-shaped capacitor 5 and the capacitor 55. When the potential of the S-shaped capacitor 5 is lower than that of the capacitor 55, a current flows in the forward direction of the diode 52. That is, a current flows toward the S-shaped capacitor 5. Thus, a deflection current is supplied through the S-shaped capacitor 5 to the horizontal deflection yoke 4. When the potential of the S-shaped capacitor 5 is higher than that of the capacitor 55, a current flows from the S-shaped capacitor 5 to the capacitor 55 through the switching element 51. In this case, the deflection current is supplied to the horizontal deflection yoke 4 so that it may flow through the horizontal deflection yoke 4 into the S-shaped capacitor 5. At this time, the control section 60 opens or closes the switching element 51, thereby controlling the current flowing from the S-shaped capacitor 5 to the capacitor 55.

Figure 8:
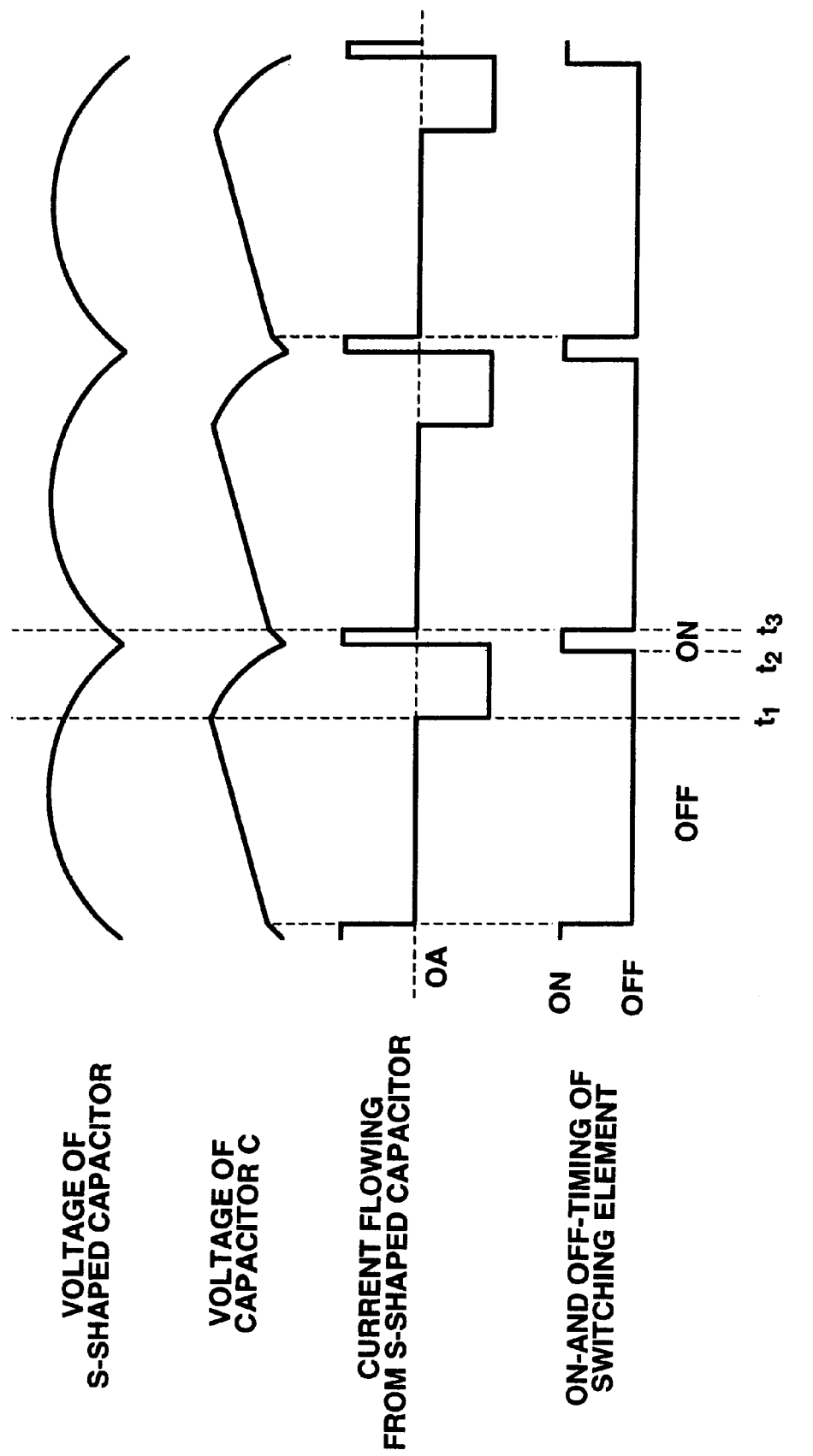
FIG. 8 is a timing chart explaining how the centering circuit operates when a current flows from the S-shaped capacitor to the capacitor.
Figure 9:
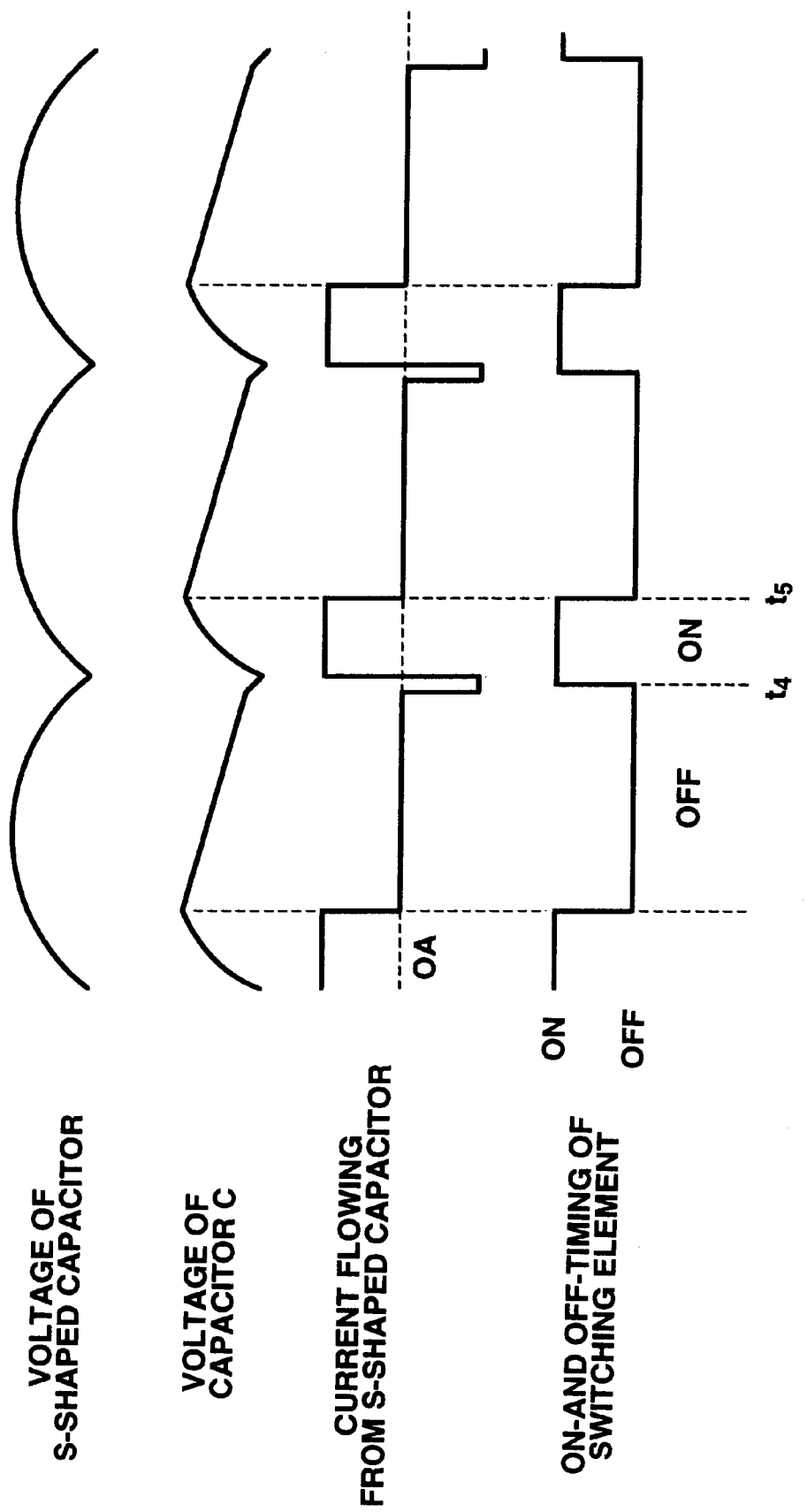
FIG. 9 is a timing chart explaining how the centering circuit operates when a current flows from the capacitor to the S-shaped capacitor.

How the centering circuit 50 operates will be explained, with reference to FIGS. 8 and 9.

At first, the switching element 51 is turned off in the latter half of each scanning period. The voltage across the S-shaped capacitor 5 changes in the form of a parabola wave, as is illustrated in FIGS. 8 and 9. In the latter half of the scanning period, that is, after time $t_1$, the potential across the S-shaped capacitor 5 falls below the potential of the capacitor 55. Then, the diode 52 is turned on, whereby a current flows from the capacitor 55 to the S-shaped capacitor 5. The potential of the capacitor 55 also falls, while remaining at substantially the same value as the potential across the S-shaped capacitor 5. After the diode 52 is turned on, the switching element control section 60 turns on the switching element 51 at time $t_2$, before the voltage across the S-shaped capacitor 5 begins to fall.

When the potential across the S-shaped capacitor 5 begins to rise, the diode 52 is turned off. A current starts flowing from the S-shaped capacitor 5 through the switching element 51. This current keeps flowing until time t3 when the switching element control section 60 turns off the switching element 51.

As a result, a current, which is the difference between the current flowing into, through the diode 52 and the current flowing out through the switching element 51, flows into the S-shaped capacitor 5. If the on-period of the switching element 51, i.e., the time during which the element 51 remains on, is shortened, a current will flow to the S-shaped capacitor 5 through the diode 52. Conversely, if the on-period of the switching element 51 is lengthened as the period between time t4 and time t5 shown in FIG. 9, the current flowing into the S-shaped capacitor 5 will decrease, by supplying a larger current through the switching element 51 than through the diode 52. Thus, the switching element control section 60 controls the on-period of the switching element 51, changing the direction in which the current is supplied to the horizontal deflection yoke 4 and, thus, varying the raster position in the horizontal direction.

An example of the centering circuit 50 will be described, with reference to FIG. 10.

This example is different from the one shown in FIG. 7 in that a FET switch element 61 is provided in place of the switching element 51 and the diode 52. The FET switch element 61 comprises a MOSFET (metal oxide semiconductor field-effect transistor) and a diode 52. The MOSFET performs the same function as the switching element 51. The FET switch element 61 can be turned on and off by means of the switching element control section 60.

Figure 10:
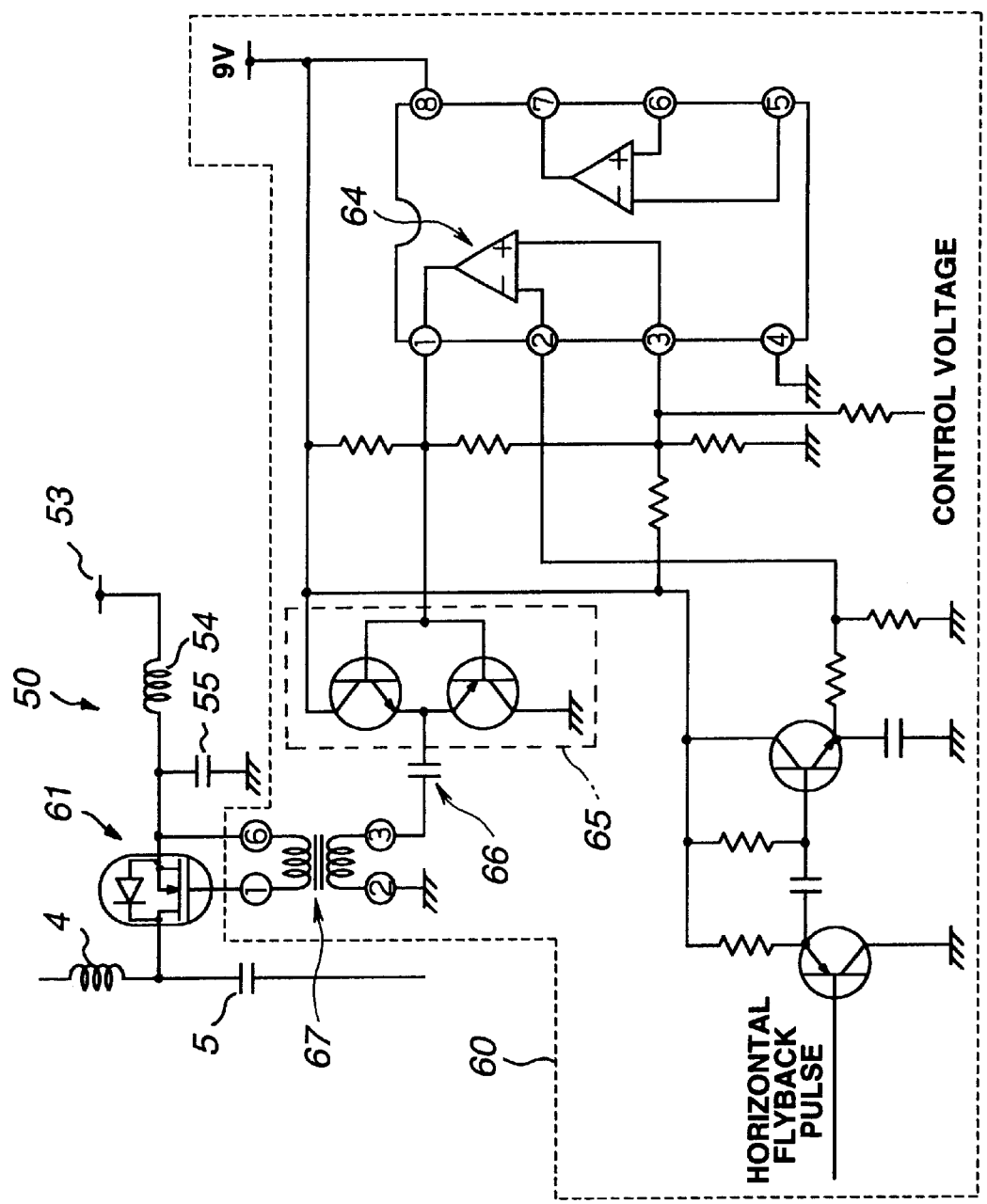
FIG. 10 is a circuit diagram of the switching element control section.

The switching element control section 60 has the structure shown in FIG. 10.

A horizontal flyback pulse signal and a control voltage are input to the switching element control section 60. In the switching element control section 60, the pulse signal is wave-shaped into a triangular-wave pulse signal. A comparator circuit 64 compares and slices the triangular-wave pulse signal with the control voltage, thereby generating a rectangular-pulse signal. The rectangular-pulse signal is input to the primary winding of a drive transformer 67 through a capacitor 66. The output from the secondary winding of the drive transformer 67 performs PWM control on the FET switch element 61.

Constructed as shown in FIG. 10, the switching element control section 60 controls the on- and off-periods of the FET switch element 61 by changing the control voltage. Hence, the control section 60 can control the current that flows from the S-shaped capacitor 5 to the capacitor 55.

The FET switch element 61 may be replaced by a diode 52 and an ordinary FET.

The horizontal deflection circuit 1 described above has the switching element 51 and the switching element control section 60. Since the control section 60 controls the on-period and off-period of the switching element 51, the horizontal deflection circuit 1 can controls the current that flows from the S-shaped capacitor 5 to the capacitor 55. Therefore, the horizontal deflection circuit 1 can control the current that flows into the horizontal deflection yoke 4, preventing an excessively large current from flowing from the S-shaped capacitor 5 into the capacitor 55. The raster position can therefore be adjusted, unlike in the conventional horizontal deflection circuit. That is, in the horizontal deflection circuit 1, the switching element control section 60 adjusts the on- and off-period of the switching element 51, thus controlling the current that flows from the S-shaped capacitor 5 into the capacitor 55 and, hence, into the horizontal deflection yoke 4. This renders it possible to continuously change the distance for which the raster should be moved. In addition, the on- and off-period of the switching element 51 can be changed, without operating a manual switch or the like, in the horizontal deflection circuit 1. Furthermore, the centering circuit 50 incorporated in the deflection circuit 1 can be inexpensive, because it does not need any power supply of a higher voltage than is necessary to drive the deflection yoke.

An embodiment has been described above in detail. It should be noted that the present invention is not limited to the embodiment. Various technical change and modifications can be made without departing the scope and spirit of the invention.

As described above in detail, the horizontal deflection circuit according to the invention comprises: a diode, of which cathode which is connected to a node of an S-shaped capacitor and the deflection yoke; a capacitor connected to the anode of the diode; a switching element connected in parallel to the diode; and switching element control means for opening and closing the switching element, thereby to control a current to be supplied from the S-shaped capacitor to the capacitor and, ultimately, a current to be supplied to the deflection yoke. Therefore, the raster position can be continuously adjusted.

What is claimed is:

1. A horizontal deflection circuit comprising a centering circuit designed to change a direction of a current which is supplied to a deflection yoke, thereby adjusting a position of a raster in a horizontal direction, said centering circuit comprising:

a switching element including first and second ends, said first end of said switching element being connected to a node positioned between a first end of a first S-shaped capacitor and the deflection yoke, said second end being connected to a first end of a second capacitor, and wherein a second end of said first S-shaped capacitor and a second end of said second capacitor are connected to a ground;

switching element control means for controlling an on- and off-state of the switching element, thereby controlling a current to be supplied from the first S-shaped capacitor to the second capacitor and controlling a current to be supplied from said second capacitor to said first S-shaped capacitor, wherein said currents supply said deflection yoke;

a coil connected at a first end to the node of the second capacitor and the switching element, and at a second other end to a direct-current power supply; and a diode connected in parallel to the switching element and having an anode connected to the node of the second capacitor and the switching element.

2. A horizontal deflection circuit comprising a centering circuit designed to change a direction of a current which is supplied to a deflection yoke, thereby adjusting a position of a raster in a horizontal direction, said centering circuit comprising:

a switching element including first and second ends, said first end of said switching element being connected to a node positioned between a first end of a first S-shaped capacitor and the deflection yoke, said second end being connected to a first end of a second capacitor, and wherein a second end of said first S-shaped capacitor and a second end of said second capacitor are connected to a ground;

switching element control means for controlling an on- and off-state of the switching element, thereby controlling a current to be supplied from the first S-shaped capacitor to the second capacitor and controlling a current to be supplied from said second capacitor to said first S-shaped capacitor, wherein said currents supply said deflection yoke; and a coil connected at a first end to the node of the second capacitor and the switching element, and at a second other end to a direct-current power supply, wherein the switching element control means receives, as input signals, a horizontal flyback pulse signal and a control voltage, and comprises voltage-generating means for generating a triangular-wave voltage from the horizontal flyback pulse signal, voltage-slicing means for slicing the triangular-wave voltage with the control voltage, thereby to generate a rectangular-pulse signal, and means for supplying the rectangular-pulse signal to the switching element.

3. A horizontal deflection circuit comprising a centering circuit designed to change a direction of a current which is supplied to a deflection yoke, thereby adjusting a position of a raster in a horizontal direction, said centering circuit comprising:

a switching element including first and second ends, said first end of said switching element being connected to a node positioned between a first end of a first S-shaped capacitor and the deflection yoke, said second end being connected to a first end of a second capacitor, and wherein a second end of said first S-shaped capacitor and a second end of said second capacitor are connected to a ground;

switching element control means for controlling an on- and off-state of the switching element, thereby controlling a current to be supplied from the first S-shaped capacitor to the second capacitor and controlling a current to be supplied from said second capacitor to said first S-shaped capacitor, wherein said currents supply said deflection yoke; and a coil connected at a first end to the node of the second capacitor and the switching element, and at a second other end to a direct-current power supply, wherein the direct-current power supply connected to the coil is of the same voltage as a power supply that drives the deflection yoke.

4. The horizontal deflection circuit according to claim 3, wherein the switching element control means controls the on- and off-state of the switching element in a horizontal retrace period by means of pulse width modulation.

5. The horizontal deflection circuit according to claim 3, wherein the switching element is a field-effect transistor.

6. A horizontal deflection circuit comprising a centering circuit designed to change a direction of supplying a current to a deflection yoke, thereby to move a raster in a horizontal direction and, hence, adjust the position of the raster, said centering circuit comprising:

a switching element connected at one end to a node of a S-shaped capacitor and the deflection yoke;

a capacitor connected at one end to the other end of the switching element, and the other end to a ground; and switching element control means for controlling on- and off-state of the switching element, thereby to control a current to be supplied from the S-shaped capacitor and to control, ultimately, a current to be supplied to the deflection yoke, a coil connected at one end to the node of the capacitor and the switching element, and at the other end to a direct-current power supply, a diode connected in parallel to the switching element and having a node connected to the node of the capacitor and the switching element, wherein the switching element control means controls the on- and off-state of the switching element in a horizontal retrace period by means of pulse width modulation, and wherein the direct-current power supply connected to the coil is of the same voltage as a power supply that drives the horizontal yoke.

7. The horizontal deflection circuit according to claim 6, wherein the switching element control means receives, as input signals, a horizontal flyback pulse signal and a control voltage, and comprises voltage-generating means for generating a triangular-wave voltage from the horizontal flyback pulse signal, voltage-slicing means for slicing the triangular-wave voltage with the control voltage, thereby to generate a rectangular-pulse signal, and means for supplying the rectangular-pulse signal to the switching element.

8. The horizontal deflection circuit according to claim 7, wherein the switching element is a field-effect transistor.

\* \* \* \* \*